United States Patent [19]

Ferri et al.

[11] 4,199,333
[45] Apr. 22, 1980

[54] FILTER BOX FOR TEXTILE MACHINES

[75] Inventors: Johann W. Ferri, Greifensee; Werner Steinmetz, Wetzikon; Emil Briner, Winterthur; Bruno Fritschi, Uster, all of Switzerland

[73] Assignee: Luwa AG, Zurich, Switzerland

[21] Appl. No.: 14,204

[22] Filed: Feb. 22, 1979

[30] Foreign Application Priority Data

Mar. 3, 1978 [CH] Switzerland ............... 2325/78

[51] Int. Cl.² ............................................. B01D 50/00
[52] U.S. Cl. ........................................ 55/290; 55/291; 55/296; 55/302; 55/317; 55/323; 55/337; 55/338; 55/430; 55/471; 55/473; 55/482
[58] Field of Search ............... 55/290, 291, 296, 301, 55/317, 320, 321, 318, 400, 403, 430, 471, 473, 482, 351, 337, 338, 302, 323

[56] References Cited

U.S. PATENT DOCUMENTS

| | | | |
|---|---|---|---|
| 971,895 | 10/1910 | Joedicke | 55/296 |
| 2,520,589 | 8/1950 | White | 55/290 |
| 3,025,785 | 3/1962 | Deems | 55/296 |
| 3,568,414 | 3/1971 | Spriggs et al. | 55/337 |
| 3,601,955 | 8/1971 | Ferri | 55/374 |
| 3,616,617 | 11/1971 | Groote | 55/337 |
| 3,628,313 | 12/1971 | Broadbent | 55/290 |
| 3,864,107 | 2/1975 | Baigas, Jr. | 55/320 |
| 4,045,194 | 8/1977 | Ferri | 55/290 |
| 4,090,857 | 5/1978 | Ferri et al. | 55/337 |

FOREIGN PATENT DOCUMENTS

| | | | |
|---|---|---|---|
| 2542300 | 3/1977 | Fed. Rep. of Germany | 55/296 |
| 117130 | 9/1946 | Sweden | 55/317 |

*Primary Examiner*—Frank W. Lutter
*Assistant Examiner*—Gregory N. Clements
*Attorney, Agent, or Firm*—Werner W. Kleeman

[57] ABSTRACT

A filter box contains within a rotatably mounted filter, structured as a drum, a fiber preseparator cooperating with such filter. The fiber preseparator has a ventilator at its inlet and operatively flow communicates with a fiber separator. This fiber separator contains a movable plunger or equivalent structure, by means of which the separated fibers are compacted and ejected into a collecting container. The air flowing through the filter effluxes through an opening in the filter box into the machine room or area containing the textile machines with which the filter box is used. The air responsible for transport of the fibers from the preseparator into the fiber separator, following separation from the fibers, is returned back to the suction side of the ventilator and again into the preseparator. A suction tube cooperates with the inner side or wall of the rotating filter drum. This suction tube likewise flow communicates with the suction side of the ventilator by means of a dust separator. Connected with the dust separator is a dust collecting container. The filter box is particularly suitable for connection with textile machines of the type which only permit slight pressure fluctuations at the suction locations.

16 Claims, 1 Drawing Figure

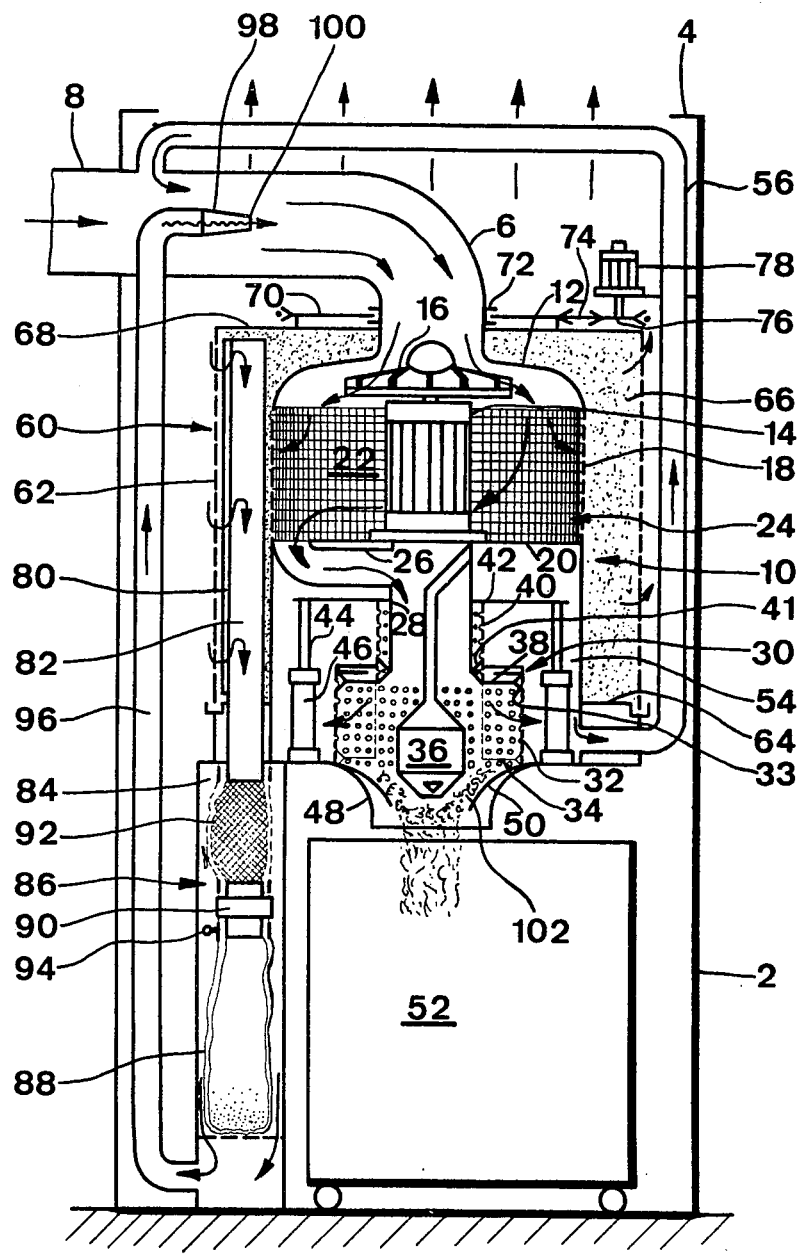

FILTER BOX FOR TEXTILE MACHINES

BACKGROUND OF THE INVENTION

The present invention relates to a new and improved construction of a filter box for textile machines, which filter box is of the type comprising an inlet connection, a filter element equipped with means for cleaning the filter element, an outlet opening at the clean air side and an outlet opening at the raw air side of the filter element, as well as a ventilator or fan.

There are already known to the art filter boxes of the previously mentioned type, wherein, for the purpose of cleaning the filter element, there is produced a cleaning air current, for instance by switching flap valves. This cleaning air current flows in a direction opposite to the work air current. The fibers which arrive at the raw air side and the contaminants are periodically removed. Removal of such contaminants either is accomplished manually or pneumatically, in the event that the filter box is connected at a central suction installation having a fiber depository.

The state-of-the-art filter boxes can be used successfully in those instances where the pressure surges or pressure fluctuations at the suction locations of the connected machine or machines do not have any disturbing effect upon the work process which occurs at such machine or machines. These pressure fluctuations, apart from the gradual covering or coating of the filter element, are particularly caused by the periodic cleaning of the filter element, i.e., the removal of the fibers and contaminants by emptying the raw air compartment.

When using such type filter boxes in conjunction with certain spinning preparatory machines, e.g. drafting arrangements, it has been found however that such pressure fluctuations can lead to interruptions in the work process, for instance due to slubbing or sliver rupture.

What is also disadvantageous is that the automatic cleaning and emptying of such filter boxes requires the connection at the suction installations by means of complicated tubular conduits or the like. Furthermore, the suction installations, in turn, must be equipped with dust filters and devices for cleaning the same, in order to reclaim the separated fibers.

SUMMARY OF THE INVENTION

Therefore, with the foregoing in mind, it is a primary object of the present invention to provide a new and improved construction of filter box for textile machines which is not associated with the aforementioned drawbacks and limitations of the prior art proposals.

Another and more specific object of the present invention aims at the provision of a new and improved construction of a filter box wherein, due to continuous removal of the fibers at the raw air side of the filter element, there are avoided pressure surges and there arise only slight pressure fluctuations, while utilizing a space-saving arrangement.

Yet a further significant object of the present invention aims at the provision of a new and improved construction of filter box for use with textile machines, which filter box is relatively simple in construction and design, economical to manufacture, extremely reliable in operation, not readily subject to breakdown or malfunction, and requires a minimum of maintenance and servicing.

Now in order to implement these and still further objects of the invention, which will become more readily apparent as the description proceeds, the filter box of the present development is manifested by the features that there is arranged within the filter element, structured as a rotatable drum, a fiber preseparator disposed forwardly of the filter element and operatively connected by means of the fan with the inlet connection. Operatively connected with the fiber preseparator is a fiber separator which is likewise arranged within the filter element. A suction element or suction means having a subsequently connected dust separator operatively coacts with the inner surface or inner wall of the drumlike filter element.

The fiber preseparator arranged internally of the filter element and ahead of the same and in cooperating relationship therewith, prevents filling of the raw air compartment or chamber with fibers, and therefore, renders superfluous periodic emptying which would cause a pressure surge. This fiber preseparator, with a large filter surface, allows for a particularly advantageous utilization of the involved volume, since also the fiber separator does not require any additional space. In consideration of the desire to render autonomous the filter box both as concerns fiber separation and also dust separation, there is justified utilization thereof even for a single machine.

Due to the preseparation of the fibers and the continuous cleaning of the filter a practically constant pressure drop opposes the major proportion of the air which is sucked away at the machine. To the extent that changes in the pressure drop arise at the fiber separator, such changes are of no great consequence in view of the small quantity of air which insures for the transport of the fibers from the preseparator into the fiber separator.

In the case of suction installations which are designed as central systems for textile machine rooms, it is admittedly already known to the art to employ, apart from a preseparator and a dust filter, a fiber separator. Transport of the contaminants or fibers concentrated at the preseparator into the fiber separator is accomplished by a residual portion of transport air.

Although however with such type installations it is necessary to work with appropriately dimensioned elements owing to the usually very large quantities of air, there are not undertaken any space-saving measures in the sense of the present invention.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically shows in lognitudinal sectional view an exemplary embodiment of filter box for a textile machine according to the invention.

DETAILED DESCRIPTION OF THE PREFERRED EMBODIMENTS

Describing now the drawing, the single FIGURE shows schematically and in vertical sectional view an exemplary embodiment of filter box for a textile machine, wherein to simplify the illustration the textile machine or machines with which the filter box is employed has been omitted, particularly since details thereof are unimportant for understanding the underlying principles and teachings of the present invention. Reference character 2 designates a filter box, constructed according to the invention, and which is open at its upper end or side 4. This filter box 2 contains a curved inlet connection or pipe 6 or equivalent structure. This inlet connection 6 is operatively connected by means of a conduit or pipe 8 with a not particularly illustrated textile machine, for instance a drafting system, at whose suction locations there are deposited fibers which are to be removed.

An upright, substantially cylindrical housing 10, at whose cover portion or part 12 there opens the inlet connection 6, contains coaxially arranged therein an electric motor 14 or other suitable drive, upon whose not particularly illustrated drive shaft there is mounted in overhung position a ventilator impeller 16 or equivalent structure, the inlet or suction side of which confronts the inlet connection 6. A substantially cylindrical sieve or filter body 18, forming part of the wall of the housing 10, in conjunction with an essentially horizontal partition wall 20 bounds or delimits a separation compartment or chamber 22 of a fiber preseparator, generally designated by reference character 24.

By means of a connection tube 26 and an inlet connection 28 there is connected with the preseparator 24 a fiber separator, generally designated by reference character 30. This fiber separator 30 is likewise arranged within the housing 10. Fiber separator 30 possesses a separation compartment or chamber 34 which is bounded by a substantially cylindrical sieve or filter body 32. This separator or separation compartment 34 contains a displacement body 36 arranged essentially coaxially with respect to the inlet connection 28 and the sieve or filter body 32. The separation compartment 34 is bounded at its upper end by a substantially ring-shaped plunger 38. This plunger 38 is operatively connected by means of a sieve or filter tube 40, arranged essentially coaxially with respect to the inlet connection 28, and a substantially ring-shaped pressure plate 42 with symmetrically engaging piston rods 44 of two piston-and-cylinder units 46. The plunger 38 and the sieve tube or pipe 40 can be considered to constitute ejection means for displacing the fibers out of the separation compartment 34 of the fiber separator 30. An outlet connection or connecting piece 48 of the fiber separator 30 contains a closure ring 50. This closure ring 50 is clamped in any convenient manner at its outer circumference and consists of radially directed leaf springs or an elastic material or other suitable structure, and the inner edge of such closure ring 50, in its closed position, bears against the underside of the displacement body 36.

Below the outlet connection 48 there is arranged at the filter box 2 an upwardly open fiber container or receptacle 52 which may be designed, if desired, so as to be mobile, for instance can travel on the not particularly referenced rollers or casters mounted at the floor of such fiber container 52. The filter box 2 is provided with a not particularly illustrated opening which enables exchanging a filled container 52 for an empty container, and such opening can be closed by a likewise not particularly shown door or the like.

At this point it is to be mentioned that the sieve or filter bodies 32 and 40 have operatively associated therewith the scrapers 33 and 41, respectively. The scraper 33 or equivalent structure is attached at the periphery of the plunger 38 and is movable in conjunction therewith, whereas the other scraper 41 is secured to the lower end of the inlet connection 28. The annular or ring-shaped compartment 54 formed between the housing 10 and the fiber separator 30 flow communicates by means of a conduit or line 56 with the inlet connection 6.

The housing 10 is surrounded by a filter element or filter 60. The filter element 60 is arranged essentially coaxially with respect to the housing 10 and is structured as a drum member. This drum-like filter element 60 possesses a substantially cylindrical filter body 62 which is rotatably mounted at its lower edge in a stationary flange ring 64 which is attached at the housing 10. The flange ring 64 constitutes the lower boundary of a substantially ring-shaped filter compartment or chamber 66 which is formed between the housing 10 and the filter body 62. This filter compartment 66 is closed at the upper end of the filter body 62 by means of a substantially ring-shaped plate or plate member 68 which is rigidly connected therewith. This plate 68 is rotatably mounted upon the inlet connection 6. Further, in the exemplary embodiment under discussion, this plate 68 carries at its upper face a belt pulley 70 which surrounds the inlet connection 6 and cooperates with a seal 72 which is mounted upon such inlet connection 6. A drive belt 74 is trained about both the belt pulley 70 and a further belt pulley 76 which is driven by a suitable electric drive motor 78 attached at the inner wall of the filter box 2.

Operatively associated with the not particularly referenced inner surface or inner wall of the filter body 62 is a suction slot 80 of a suction tube or pipe 82. The suction slot 80 extends over the entire length of the inner surface of the filter body 62. Further, the suction conduit or pipe 82 extends within the filter compartment 66 essentially parallel to the lengthwise axis of the filter element 60 and terminates in a suction compartment 84 arranged below the filter element 60. A dust separator 86 is connected with the lower end of the suction conduit or tube 82 within the suction compartment or chamber 84. This dust separator 86 is connected in turn with a dust bag or sack 88 or equivalent structure. The dust separator 86 possesses a filter hose 92 which is loosely clamped between the lower end of the suction conduit or tube 82 and a connection collar 90 as well as a clamping device 94 which retains the upper edge or end of the dust bag or sack 88. The suction compartment 84 is connected with the inlet connection 6 by means of a suction conduit or line 96 which terminates at a nozzle-shaped mouth piece or element 98. This nozzle-shaped mouth piece 98 is arranged essentially coaxially with respect to the inlet connection 6 and possesses a mouth 100 which is directed downstream with regard to the flow direction.

The suction compartment 84 further possesses a not particularly illustrated servicing and removal opening for the dust bag 88, which opening likewise can be closed in an airtight fashion by any suitable and therefore not particularly illustrated cover or equivalent structure.

During operation of the filter box 2 which is connected at one or a number of textile machines, typically for instance by way of example but not limitation, cards or drafting systems, air charged with fibers and contaminants is withdrawn from the suction locations of the connected textile machine by the action of the ventilator 16 and through the tubular conduit 8 and the inlet connection 6.

The air conveyed by the ventilator 16, upon entry into the separation compartment or chamber 22, has imparted thereto a spin or twist-like flow, and the outwardly propelled fibers experience a deflection in the axial direction by virtue of the downwardly domed, outer edge of the cover or roof part 12. The fibers are thus moved along the inner surface of the sieve body 18 in the direction of the partition wall 20 and the outlet connection or connection tube 26, and the spin or twist flow, owing to its velocity, extensively precludes any deposition of fibers at the inner surface of the sieve body 18. The air which is still charged with dust effluxes through the sieve body 18 into the compartment or chamber 66, flows through the filter body 62 and departs from filter box 2 through the cover opening 4 in a cleaned state. The fibers, which arrive by means of a residual air flow at the inlet connection 28 of the fiber separator 30, deposit within the separation compartment 34, whereas the residual air flows out through the sieve or filter body 32 into the compartment 54 and is returned by means of the tubular conduit or pipe 56 to the inlet connection 6.

The closure ring 50 which is arranged in the outlet connection 48, in the illustrated position, is raised with a pre-bias from the displacement body 36, but fibers cannot depart out of the compartment 34, since between the closure ring or closure means 50 and the displacement body 36 there is formed a substantially ring-shaped fiber plug, generally indicated by reference character 102. This fiber plug or slug 102 or the like also prevents the escape of air into the part of the filter box 2 which surrounds the container 52. During the periodically occurring emptying of the fiber separator 30, the plunger 38 is moved downwardly by actuating the piston-and-cylinder units 46. As a result, the fibers which are contained in the compartment or chamber 34 are compacted or compressed and, while further deforming the closure ring 50, are ejected through the connection 48 in the opening direction. The fibers thus drop in a compressed or agglomerated condition into the container 52. During descent of the plunger 38 the fibers which adhere to the inner surface of the sieve body 32 are removed by the scraper or scraper means 33, with the result that this sieve or filter body 32 is periodically cleaned. Fibers which are separated during the ejection operation nonetheless arrive at the inlet connection 28, since the sieve or filter body 40 which moves downwardly in conjunction with the plunger 38 also then enables escape of the residual air flow when the already compacted fibers within the separation compartment 34 prevent a throughflow of the air below the plunger 38. Consequently, the residual air flows through the sieve or filter body 40 directly into the compartment or chamber 54, and the separated fibers collect above the displacement body 36. Upon completion of the compaction or ejection operation, during retraction of the plunger 38 the inner surface of the sieve body 40 is freed of adhering fibers by the scraper or stripper means 41. If the plunger 38 has again reached its illustrated starting or rest position, nothing precludes the outflow of the fibers which have collected above the displacement body 36 into the separation compartment 34. The displacement body 36 which, on the one hand, causes a deflection of the residual air against the inner surface of the sieve or filter body 32, on the other hand, prevents any escape of the fibers which are to be compacted during descent of the plunger 38 in the sieve body 40.

At the suction slot 80 there is formed a suction air flow or current due to the connection of the suction conduit or pipe 80 by means of the dust separator 92, the compartment 84 and the conduit or pipe 96 with the inlet connection 6. This suction air flow acts more intensely in the manner of a jet pump due to the arrangement of the mouth piece or element 98 at the inlet connection 6. During the continuous or periodically occurring rotation of the filter element 60 the inner surface or inner wall of the filter body 62 is freed of dust which has deposited thereon.

As will be apparent from the previous description, it is possible to reckon with an essentially constant pressure drop for the major part of the air inflowing through the inlet connection 6 into the filter box 2, i.e., that part of the air which flows through the opening 4 into the room, since the sieve or filter body 18, by virtue of the spin flow, experiences a continuous self-cleaning action, while the cleaning of the large surface filter body 62, after placing the system into operation, produces practically constant conditions. Although the pressure drop through the fiber separator 30 is not constant, it only affects a very small part of the total quantity of air which is sucked-up from the textile machines connected with the filter box. Consequently, the there occurring pressure fluctuations are extremely slight.

An approximately constant pressure drop also then can be obtained in the fiber separator if the element responsible for the scraping of its sieve body is continuously moved. This can be realized in a relatively simple manner in that, instead of using a plunger, there is rotatably arranged a worm as the compaction and ejection element coaxially within the rotationally symmetrically constructed separation compartment, this worm continuously wipingly contacting the inner surface of the sieve or filter body.

On the other hand, it is also possible to arrange the compaction and ejection element which is structured in the form of a worm at the outlet from the separation compartment.

Notwithstanding the fact that the described filter box affords a separate separation of the dust and fibers, with the arrangement of the fiber preseparator and the fiber separator within the volume occupied by the filter element, i.e., within the drum which is formed by the filter element, there are realized relatively small dimensions for the designed system. Hence, the filter box can be arranged, without any excessive loss in space, directly neighboring the connected textile machines.

While there are shown and described present preferred embodiments of the invention, it is to be distinctly understood that the invention is not limited thereto, but may be otherwise variously embodied and practiced within the scope of the following claims. Accordingly,

What we claim is:

1. A filter box for textile machines, comprising:
    inlet connection means for the infeed of raw air containing fibers and contaminants;
    a filter element structured in the form of a rotatable drum;
    means for cleaning the filter element of contaminants entrained thereby;
    ventilator means for drawing raw air containing the fibers and contaminants from said inlet connection means into said filter element;
    a fiber preseparator arranged within and forwardly of the rotatable drum-like filter element and operatively flow communicating by means of said ventilator means with said inlet connection means;

a fiber separator arranged within said filter element and operatively connected with said fiber preseparator;

said filter element having an inner wall; and said means for cleaning including a suction element and subsequently connected dust separator operatively associated with the inner wall of said filter element.

2. The filter box as defined in claim 1, wherein:

said fiber separator is arranged downstream of said fiber preseparator with respect to the direction of air flow.

3. The filter box as defined in claim 1, further including:

common housing means within which there are arranged said fiber preseparator and said fiber separator.

4. The filter box as defined in claim 3, wherein:

said fiber preseparator comprises a substantially cylindrical sieve body containing a separation compartment; and said ventilator means serving for producing a spin flow of the air in said separation compartment.

5. The filter box as defined in claim 4, further including:

movable fiber ejection means operatively associated with said fiber separator;

said fiber separator comprising a separation compartment; and said ejection means being arranged within said separation compartment of said fiber separator.

6. The filter box as defined in claim 4, wherein:

said fiber separator comprises a separation compartment bounded by a substantially cylindrical sieve body;

a displacement body arranged substantially coaxially within said separation compartment of the fiber separator;

outlet connection means provided for said fiber separator;

closure means provided for said outlet connection means and cooperating with said displacement body;

a substantially ring-shaped plunger cooperating with an inner surface of said sieve body of the fiber separator;

said plunger being provided with scraper means coacting with said inner surface of said sieve body of said fiber separator;

inlet connection means provided for said fiber separator;

a sieve body rigidly connected with said plunger and telescopically engaging over said inlet connection means; and stationary scraper means operatively associated with an inner surface of said telescopically engaging sieve body.

7. The filter box as defined in claim 6, further including:

a fiber collecting container arranged independently of the outlet connection means.

8. The filter box as defined in claim 3, further including:

means for rotatably mounting the filter element at said housing.

9. The filter box as defined in claim 3, wherein:

said suction element comprises a stationary suction tube possessing a suction slot extending in the lengthwise direction thereof;

means providing a suction compartment containing said dust separator; and said suction tube terminating at said suction compartment of said dust separator.

10. The filter box as defined in claim 9, wherein:

said dust separator comprises a loosely clamped filter hose; and means for connecting a dust bag with said filter hose.

11. The filter box as defined in claim 10, further including:

tube means for operatively connecting said suction compartment with said inlet connection means; and said tube means terminating at a mouth piece directed downstream with respect to the direction of air flow and arranged coaxially in said inlet connection means.

12. The filter box as defined in claim 1, further including:

movable fiber ejection means operatively associated with said fiber separator.

13. The filter box as defined in claim 6, wherein:

said fiber separator comprises a separation compartment having an outlet; and said movable ejection means being arranged at the outlet of said separation compartment.

14. The filter box as defined in claim 13, wherein:

said suction element comprises a stationary suction tube possessing a suction slot extending in the lengthwise direction thereof;

means providing a suction compartment containing said dust separator; and said suction tube terminating at said suction compartment of said dust separator.

15. The filter box as defined in claim 14, wherein:

said dust separator comprises a loosely clamped filter hose; and means for connecting a dust bag with said filter hose.

16. The filter box as defined in claim 15, further including:

tube means for operatively connecting said suction compartment with said inlet connection means; and said tube means terminating at a mouth piece directed downstream with respect to the direction of air flow and arranged coaxially in said inlet connection means.

* * * * *